UNITED STATES PATENT OFFICE.

BRUNO TERNE, OF PHILADELPHIA, PENNSYLVANIA.

PROCESS OF UTILIZING ZINC SKIMMINGS.

No. 869,750.	Specification of Letters Patent.	Patented Oct. 29, 1907.

Application filed April 11, 1907. Serial No. 367,593.

*To all whom it may concern:*

Be it known that I, BRUNO TERNE, Ph. D., a citizen of the United States, residing in Philadelphia, in the county of Philadelphia and State of Pennsylvania, have invented certain new and useful Improvements in Processes of Utilizing Zinc Skimmings, of which the following is a specification.

This invention relates to an improved process of utilizing the skimmings which are obtained in the process of galvanizing iron in its various forms.

Zinc-skimmings, commonly called in the trade sal-skimmings, are obtained in large quantities in the process of galvanizing iron and are ordinarily composed of zinc oxid, zinc chlorid, zinc oxychlorid, small particles of metallic zinc, ammonium chlorid, and small quantities of miscellaneous foreign substances. For recovering the zinc from the skimmings, various processes have heretofore been proposed, but all of them aimed at the recovery of the zinc in metallic state.

The object of this invention is to utilize the zinc-skimmings so that not only the greater part of the zinc is recovered as metallic zinc, but also a smaller quantity of the zinc recovered in the form of zinc oxid hydrate and sal-ammoniac. This is accomplished in two ways: first, by placing one part of this substance in such a shape that metallic zinc can be recovered without creating any obnoxious vapors that are injurious to the men employed at the furnaces, and objectionable to the neighborhood of the works. Second, by utilizing the water-soluble parts of the skimmings which contain the chlorids for the production of zinc oxid and sal-ammoniac.

For this purpose the invention consists of a process of utilizing zinc-skimmings which consists in grinding them under a supply of hot water, precipitating from the mixture the insoluble matter, separating the solution from the precipitate, drying the latter for recovering the metallic zinc contained therein, neutralizing the solution by means of ammonia, precipitating the zinc oxid hydrate from the solution, and producing the sal-ammoniac by concentrating the solution.

In carrying out my improved process, the zinc- or sal-skimmings are ground in a suitable mill under a continuous flow of hot water and the finely ground substance run into suitable tanks in which the mixture is boiled for a certain length of time, until tests made show the practical exhaustion of all the water-soluble compounds. The mixture is then permitted to stand in the tanks for settling, after which the still turbid solution is pumped into a storage-tank, while the insoluble solid matter precipitated is transferred to a suitable drying apparatus. About 55% of the sal-skimmings are insoluble in water, while 45% are soluble and contain the chlorids which show a decided aciduous reaction. The solid matter, after drying, is ready for the reduction furnace and is sold in proportion to the zinc contained in the same. It is worked up into metallic zinc without causing any obnoxious vapors, the yield of metallic zinc varying from 50 to 65%. The solution is passed through suitable filters and delivered to a series of wooden tanks in which it is neutralized by ammonia in liquid or vapor form. The most practical way is to use the ammonia in the form of vapors obtained from a suitable still. The process of neutralizing by ammonia vapors goes on quickly, but it has to be carefully watched as an overcharge of ammonia would cause considerable loss by redissolving the zinc oxid. By means of test-paper the attendant in charge can readily avoid these losses. The result is a solid body of zinc oxid hydrate and a solution of sal-ammoniac. The precipitated zinc oxid hydrate is of a clear white color, while the solution is colorless. The solution of sal-ammoniac is then passed through a filter-press which retains all the zinc oxid hydrate carried along by the same. The solution is then evaporated and concentrated to a specific gravity which, at the temperature of the surrounding air, gives the best results in producing the crystallization of the sal-ammoniac. The zinc oxid hydrate is then pressed into cakes of suitable size which are made air-dry by being subjected to heat in a suitable drying chamber. The product may be sold as dry cakes or in ground form for being used as a paint, or it may be used as a basis for other zinc compounds. In addition to the solid matter which is worked up for metallic zinc, 20 to 25% of zinc oxid hydrate and 20 to 30% of sal-ammoniac are obtained, which have a regular market value.

The advantages of my improved process of utilizing zinc-skimmings are, first, that the skimmings are transformed into a solid substance which is worked up for metallic zinc, into zinc oxid hydrate, which is used for paints, and sal-ammoniac, the latter substances having a regular market value, and, secondly, that the regaining from the skimmings is accomplished without liberating any obnoxious vapors which are injurious to the men at the furnaces or to the neighborhood.

Having thus described my invention, I claim as new and desire to secure by Letters Patent:

1. The process herein described of utilizing zinc-skimmings, which consists in grinding and boiling the same, separating the solid precipitate from the solution which contains the chlorids, and working it up in the reduction furnace for metallic zinc.

2. The process herein described of utilizing zinc-skimmings, which consists in grinding the crude skimmings, boiling the mixture, separating the solid matter from the solution containing the chlorids, drying the solid matter, converting the same into metallic zinc in a reduction furnace, and producing from the solution zinc oxid hydrate and sal-ammoniac.

3. The process herein described of utilizing zinc-skimmings, which consists in grinding the same, dissolving the soluble salts contained in the same, separating the insoluble precipitate from the solution containing the chlorids, neutralizing the solution, precipitating the zinc oxid hydrate in a solid body, and concentrating the solution for crystallizing the sal-ammoniac from the same.

4. The process herein described of utilizing zinc-skimmings by grinding the same in hot water, boiling the mixture, separating the solid matter from the solution, neutralizing the solution containing the chlorids by ammonia, separating the precipitated zinc oxid hydrate, and concentrating the solution for crystallizing sal-ammoniac from the same.

In testimony, that I claim the foregoing as my invention, I have signed my name in presence of two subscribing witnesses.

BRUNO TERNE.

Witnesses:
PAUL GOEPEL,
HENRY J. SUHRBIER.